(12) United States Patent
Nagase et al.

(10) Patent No.: US 7,009,349 B2
(45) Date of Patent: Mar. 7, 2006

(54) ELECTRIC POWER STEERING APPARATUS

(75) Inventors: Shigeki Nagase, Mie (JP); Katsutoshi Nishizaki, Mie (JP); Takeshi Ueda, Nara (JP)

(73) Assignee: Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 10/919,268

(22) Filed: Aug. 17, 2004

(65) Prior Publication Data
US 2005/0040781 A1  Feb. 24, 2005

(30) Foreign Application Priority Data
Aug. 18, 2003  (JP) ............... P.2003-294671

(51) Int. Cl.
*B62D 5/04* (2006.01)
*B62D 6/00* (2006.01)
(52) U.S. Cl. ............... 318/133; 318/508; 318/514; 318/563; 318/609
(58) Field of Classification Search ............... 318/133, 318/138, 254, 434, 439, 489, 508, 514, 563, 318/609–611, 619, 621, 632, 720–724; 180/6.2, 180/6.44
See application file for complete search history.

(56) References Cited

U.S. PATENT DOCUMENTS

| | | | | |
|---|---|---|---|---|
| 5,631,529 A | * | 5/1997 | Shimizu et al. ............... | 318/432 |
| 6,370,459 B1 | * | 4/2002 | Phillips ............... | 701/41 |
| 6,392,854 B1 | * | 5/2002 | O'Gorman ............... | 361/31 |
| 6,400,116 B1 | * | 6/2002 | Chen et al. ............... | 318/599 |
| 6,927,548 B1 | * | 8/2005 | Nishizaki et al. ............... | 318/432 |

FOREIGN PATENT DOCUMENTS

JP  2001-106098  4/2001

* cited by examiner

*Primary Examiner*—Bentsu Ro
(74) *Attorney, Agent, or Firm*—McGinn IP Law Group, PLLC

(57) ABSTRACT

A resistor member having a resistance value substantially equal to a resistance of a relay in an ON state is inserted into a current supply path which is not inserted with the relay in current supply paths for supplying currents from a driving circuit to a brushless motor. Further, in the driving circuit, widths of bus bars forming wirings are set such that resistances of the wirings (contact resistance) from a branch point on power source side to Hi side FET (source terminals thereof) are equal to each other and widths of bus bars forming the wirings are set such that the resistances of the wirings from a ground side branch point NL to Lo side FET (source terminals thereof) become equal to each other.

4 Claims, 5 Drawing Sheets

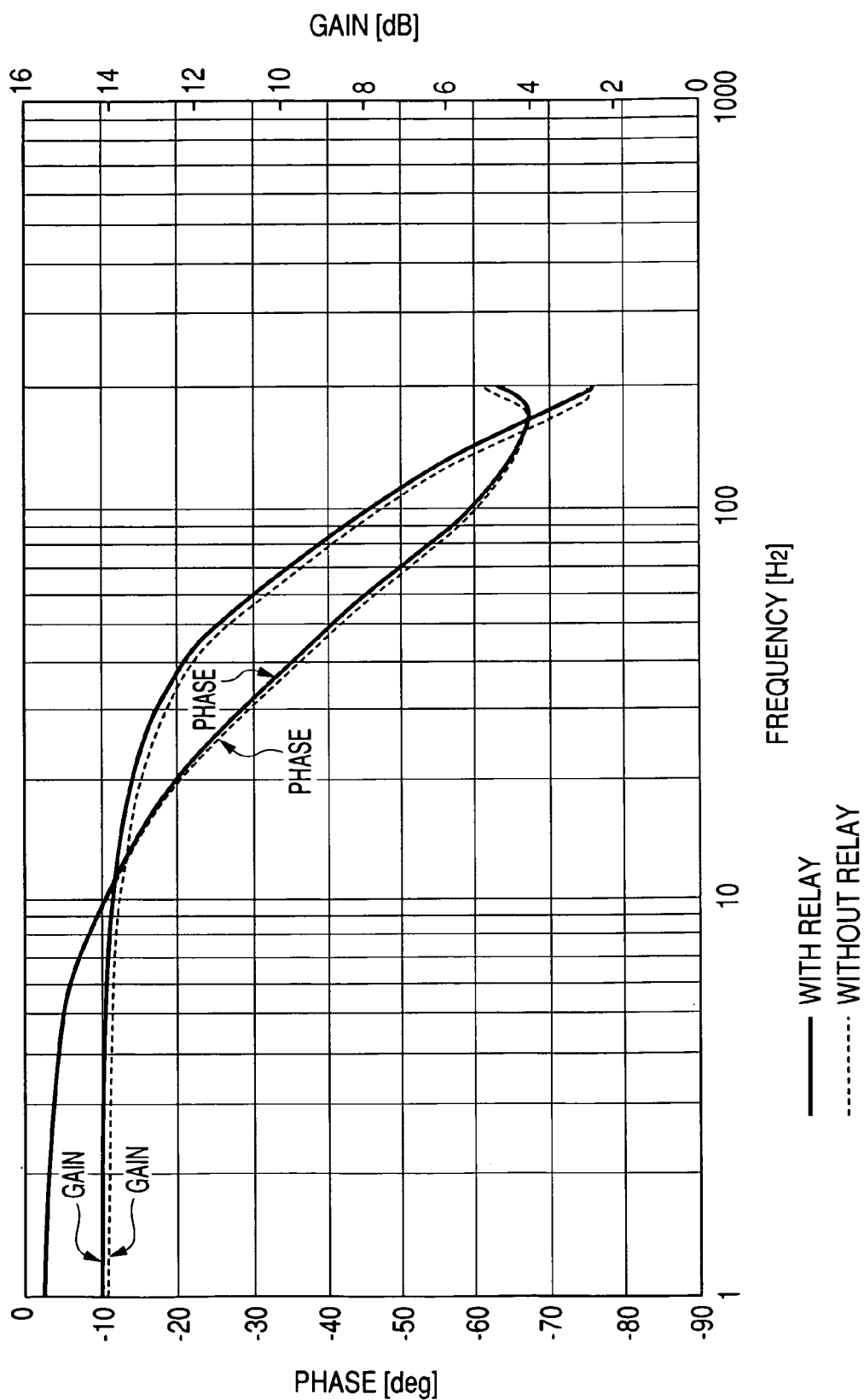

ELECTRIC POWER STEERING APPARATUS

BACKGROUND OF THE INVENTION

The present invention relates to an electric power steering apparatus for applying a steering assisting force to a steering mechanism of a vehicle by a brushless motor.

In a related art, there is used an electric power steering apparatus applying a steering assisting force to a steering mechanism by driving an electric motor in accordance with a steering torque applied to a handle (steering wheel) by a driver. The electric power steering apparatus is provided with a torque sensor for detecting the steering torque applied to the steering wheel which is an operating unit for steering, and a target value of current (hereinafter, referred to as "target current value") to be supplied to the electric motor is set based on the steering torque detected by the torque sensor. Further, an instruction value to be provided to a driving unit of the electric motors is generated by proportional integrating operation based on a deviation between the target current value and a value of current actually flowing in the electric motor. The driving unit of the electric motor is provided with a PWM signal generating circuit for generating a pulse width modulating signal (hereinafter, referred to as "PWM signal") having a duty ratio in accordance with the instruction value, and a motor driving circuit (hereinafter, simply referred to as "driving circuit") constituted by using a power transistor made to be ON/OFF in accordance with the duty ratio of the PWM signal, and applies voltage in accordance with the duty ratio to the electric motor. Current flowing in the electric motor by applying the voltage is detected by a current detecting circuit, and a difference between the target current value and the detected current value is used as the deviation for generating the above-described instruction value.

Although as an electric motor (drive source) used in such an electric power steering apparatus, in a related art, a motor with a brush has been frequently used, in recent years, there is also used a brushless motor from a standpoint of promotion of reliability and durability, a reduction in enertia and the like. According to an electric power steering apparatus using a brushless motor, there is normally provided an opening/closing unit (typically, relay) for electrically cutting to separate a driving circuit and a motor as necessary when the driving circuit is failed. In this case, it is preferable that a number of pieces of the opening/closing unit of relays or the like is as small as possible because of a restriction in cost or space and therefore, there is used opening/closing unit of a number of pieces which is necessary minimum for cutting current supplied from the driving circuit to the motor. For example, in the case of an electric power steering apparatus using a brushless motor of 3 phases, there are used 2 pieces of relays as opening/closing unit for cutting supply of currents of 2 phases in 3 phases of currents supplied from the driving circuit to the motor (see JP-A-2001-106098, for example)

According to a constitution minimizing a number of pieces of relays used as opening/closing unit as described above, in current paths of respective phases between a brushless motor and a driving circuit, there are present a phase in which a relay is interposed and a phase in which a rely is not interposed. Therefore, resistance components in a motor-driving circuit system comprising the brushless motor and the driving circuit differ among phases, and according to an electric power steering apparatus having such a circuit constitution, gains and phases of the motor-driving circuit system as transmitting elements constituting an input by a phase voltage (instruction value) to be applied to the brushless motor and constituting an output by a phase current actually flowing in the motor differ among phases. As a result, even when an equal voltage is applied to respective phases of the brushless motor in control, amplitudes and phases of currents flowing in the brushless motor differ among phases. Such a difference among phases of motor currents constitutes a factor of generating a torque ripple in the brushless motor and therefore, a driver feels a strange feeling in steering operation.

SUMMARY OF THE INVENTION

Hence, according to the invention, it is an object thereof to provide an electric power steering apparatus for preventing a driver from feeling a strange feeling in steering operation by restraining a torque ripple owing to differences among phases of gains and phases of a motor-driving circuit system.

In order to solve the aforesaid object, the invention is characterized by having the following arrangement.

(1) An electric power steering apparatus for applying a steering assisting force to a steering mechanism of a vehicle by driving a brushless motor based on a target value determined in accordance with an operation for steering the vehicle, the electric power steering apparatus comprising:

a control operating unit that calculates an instruction value of a voltage to be applied to the brushless motor based on the target value;

a driving circuit that drives the brushless motor based on the instruction value; and a resistance adjusting unit that adjusts resistance components in a motor-driving circuit system such that differences among respective phases of the resistance components in the motor-driving circuit system including the brushless motor and the driving circuit become equal to or smaller than a predetermined value.

(2) The electric power steering apparatus according to (1), further comprising an opening/closing unit inserted into at least one electric supply path in the current supply paths provided for respective phases of the brushless motor for supplying currents from the driving circuit to the brushless motor, wherein the resistance adjusting unit includes a resistor inserted into the current supply path which is not inserted with the opening/closing unit and the resistor has a resistance value in accordance with a resistance value in a closed state of the opening/closing unit such that differences among the respective phases of resistance values in the current supply paths become equal to or smaller than a predetermined value.

(3) The electric power steering apparatus according to (1), wherein the driving circuit is constituted by a plurality of pairs of switching elements connected in parallel by a number of the phases of the brushless motor, each of the pairs of switching elements includes a Hi side switching element which is the switching element arranged on a power source side and a Lo side switching element which is the switching element arranged on a ground point side, and a connection point of the Hi side switching element and the Lo side switching element is connected to the brushless motor via the current supply path; and wherein the resistance adjusting unit includes a resistor for adjusting the resistance value of at least one of the Hi side current path and the Lo side current path such that at least one of the differences among the respective phases of the resistance values of the Hi side current paths which are the current paths from the power source to the Hi side switching elements and the differences among the respective phases of the resistance values of the Lo side current paths which are the current paths from Lo side switching elements to the ground point becomes equal to or smaller than the predetermined value.

(4) The electric power steering apparatus according to (1), wherein the motor-driving circuit system includes a bus bar for wiring, and the resistance adjusting unit is constituted by adjusting at least one of a sectional area and a length of the bus bar such that the differences among the respective phases of the resistance components of the motor-driving circuit system become equal to or smaller than the predetermined value.

According to the first aspect of the invention, the differences among the respective phases of the resistance components in the motor-driving circuit system become equal to or smaller than the predetermined value and therefore, gains and phases of the motor-driving circuit system with regard to the respective phases substantially become equal to each other, as a result, with regard to any phase of the brushless motor, when the same phase voltage is applied thereto, substantially the same phase current is made to flow. Thereby, the driver can be prevented from feeling a strange feeling in steering operation by reducing the torque ripple in the brushless motor.

According to the second aspect of the invention, the differences among the respective phases of the resistance values in the current supply paths for supplying the currents from the driving circuit to the brushless motor become equal to or smaller than the predetermined value and therefore, the differences among the respective phases of the resistance components in the motor-driving circuit system are resolved or reduced. Thereby, the driver can be prevented from feeling a strange feeling in steering operation by reducing the torque ripple in the brushless motor by making the gains and the phases of the motor-driving circuit system with regard to the respective phases substantially equal to each other.

According to the third aspect of the invention, differences among the respective phases of the resistance values of the Hi side current paths and/or differences among the respective phases of the resistance values of the Lo side current paths become equal to or smaller than the predetermined value and therefore, the differences among the respective phases of the resistance components in the motor-driving circuit system are reduced or resolved. Thereby, the driver can be prevented from feeling a strange feeling in steering operation by reducing the torque ripple in the brushless motor by making the gains and the phases of the motor-driving circuit system with regard to the respective phases substantially equal to each other.

According to the fourth aspect of the invention, the differences among the respective phases of the resistance components in the motor-driving circuit system become equal to or smaller than the predetermined value by pertinently setting the sectional areas and/or the lengths of the bus bars for wirings. Therefore, it is not necessary to separately add a resistor or the like for adjusting the resistances among the phases and therefore, the differences among the respective phases of the gains and the phases of the motor-driving circuit system can be resolved or reduced while restraining an increase in cost.

BRIEF DESCRIPTION OF THE DRAWINGS

FIG. 3A is for explaining adjustment of wiring resistances in a driving circuit according to the embodiment among phases. FIGS. 3B and 3C shows shapes of essential portions.

FIG. 6 is a Bode diagram showing a frequency characteristic of a motor-driving circuit system according to an electric power steering apparatus of a related art.

DETAILED DESCRIPTION OF PREFERRED EMBODIMENTS

<1. Basic Study>

A basic study is carried out on a related art in resolving the problem of the related art. An explanation will be given of the basic study in reference to an attached drawing as follows before explaining an embodiment of the invention.

Figure 4:
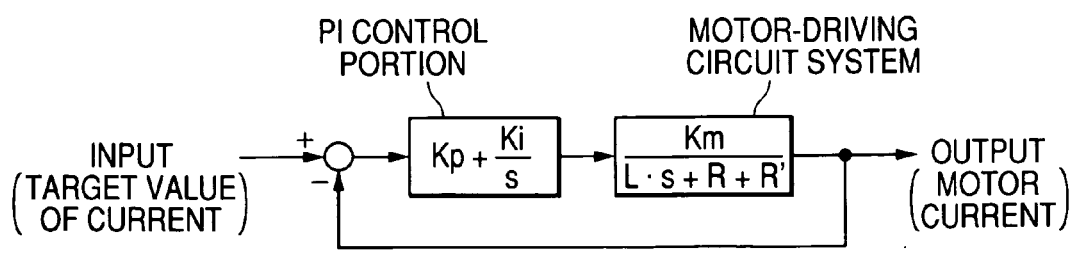
FIG. 4 is a block diagram expressing a current control system in an electric power steering apparatus by using a transfer function.

FIG. 4 is a block diagram showing a constitution of a current control system according to an electric power steering apparatus. According to the current control system, an input is constituted by a target value of a current to be made to flow to a motor, an output is constituted by the current made to flow to the motor, proportional integrating control operation (hereinafter, referred to as "PI control operation") is carried out with respect to a deviation between the current target value and the value of the current made to flow in the motor, and a voltage determined thereby is applied to a motor 1. Here, when a brushless motor is used, the motor can be dealt with as a first-order lag element determined by an inductance L and a resistance R of an amount of one phase, and a transfer function thereof can be expressed as $K/(L \cdot s+R)$ (K: constant). However, actually, there is also present an external resistance including wiring resistances of a motor and a driving circuit and therefore, when the driving circuit and the motor are dealt with as the motor-driving circuit system constituting one transfer element in consideration of the external resistance, a transfer function $Gm(s)$ of the motor-driving circuit system becomes as shown by the following equation.

$$Gm(s)=Km/(L \cdot s+R+R') \tag{1}$$

where, notation Km designates a constant, and notation R' designates the external resistance including the wiring resistances of the motor and the driving circuit or the like.

In the motor-driving circuit system, with respect to characteristic values L, R, R' determining the above-described transfer function $Gm(s)$, differences of the inductance L and the internal resistance R among phases are to almost negligible degrees. However, when the relays as an opening/closing unit are inserted as described above, normally, the relays are not inserted in all of the phases and therefore, the external resistances R' differ among the phases. Further, in the driving circuit, there is also a case in which the external resistance R' differ among the phases since it is difficult to make lengths of bus bars used in wirings between switching elements of MOS transistors or the like for power and a power source or a ground point uniform among the phases. Therefore, according to the electric power steering apparatus of the related art using the brushless motor, the gain and the phase of the motor driving system as transmitting elements differ among the phases owing to a difference of the external resistors R' among the phases.

The inventors of the application have confirmed that such a difference brings about a noticeable difference in a response of the motor-driving circuit system among the phases by measuring a frequency characteristic of the motor-driving circuit system. That is, FIG. 6 is a Bode diagram showing two examples of measuring the frequency characteristic of the motor-driving circuit system in the electric power steering apparatus using the brushless motor, and a curve shown by a solid line in FIG. 6 shows a gain characteristic and a phase characteristic as a measurement result in a first measurement example and shows a line-to-line frequency characteristic of the motor-driving circuit system when a line-to-line inductance L of the motor is 162[μH], a line-to-line internal resistance R is 53[mΩ] and a line-to-line external resistance R' is 6[mΩ]. The external resistance R' (=6 [mΩ]) in the measurement example includes a contact resistance(=2×1.5[mΩ]) which is a resistance of 2 pieces of the relays brought into an ON state. In contrast thereto, a curve shown by a dotted line in FIG. 6 shows a gain characteristic and a phase characteristic as a measurement result in a second measurement example and shows a line-to-line frequency characteristic of the motor-driving circuit system when the line-to-line inductance L of the motor is 162[μH], the line-to-line internal resistance R is 53[mΩ] and the line-to-line external resistance R' is 4.5 [mΩ]. The measurement example constitutes an object by a line-to-line interval in which 1 piece of the relay (opening/closing unit) is not included and the external resistor R' (=4.5 [mΩ]) in the measurement example does not include the contact resistance of 1 piece of the relay (other measuring conditions are similar to those of the first measurement example). It is known from the Bode diagram (gain characteristic and phase characteristic) showing the measurement results of the first and the second measurement examples that there is brought about the noticeable difference in the response (amplitude and phase of phase current) of the motor-driving circuit system between the phase which is not inserted with the relay and the phase which is inserted with the relay.

Hence, according to the invention, there is constructed a constitution providing a resistance adjusting unit for resolving or reducing a difference of resistance components in a motor-driving circuit system among respective phases by providing a pertinent resistor in a current path in correspondence with a phase of the motor-driving circuit system which is not inserted with a relay in order to resolve a difference of gains and phases of the motor-driving circuit system among respective phases in an electric power steering apparatus using a brushless motor. An explanation will be given of embodiments of the invention in reference to the attached drawings as follows.

<2. Embodiments>
<2.1 Total Constitution>

Figure 1:
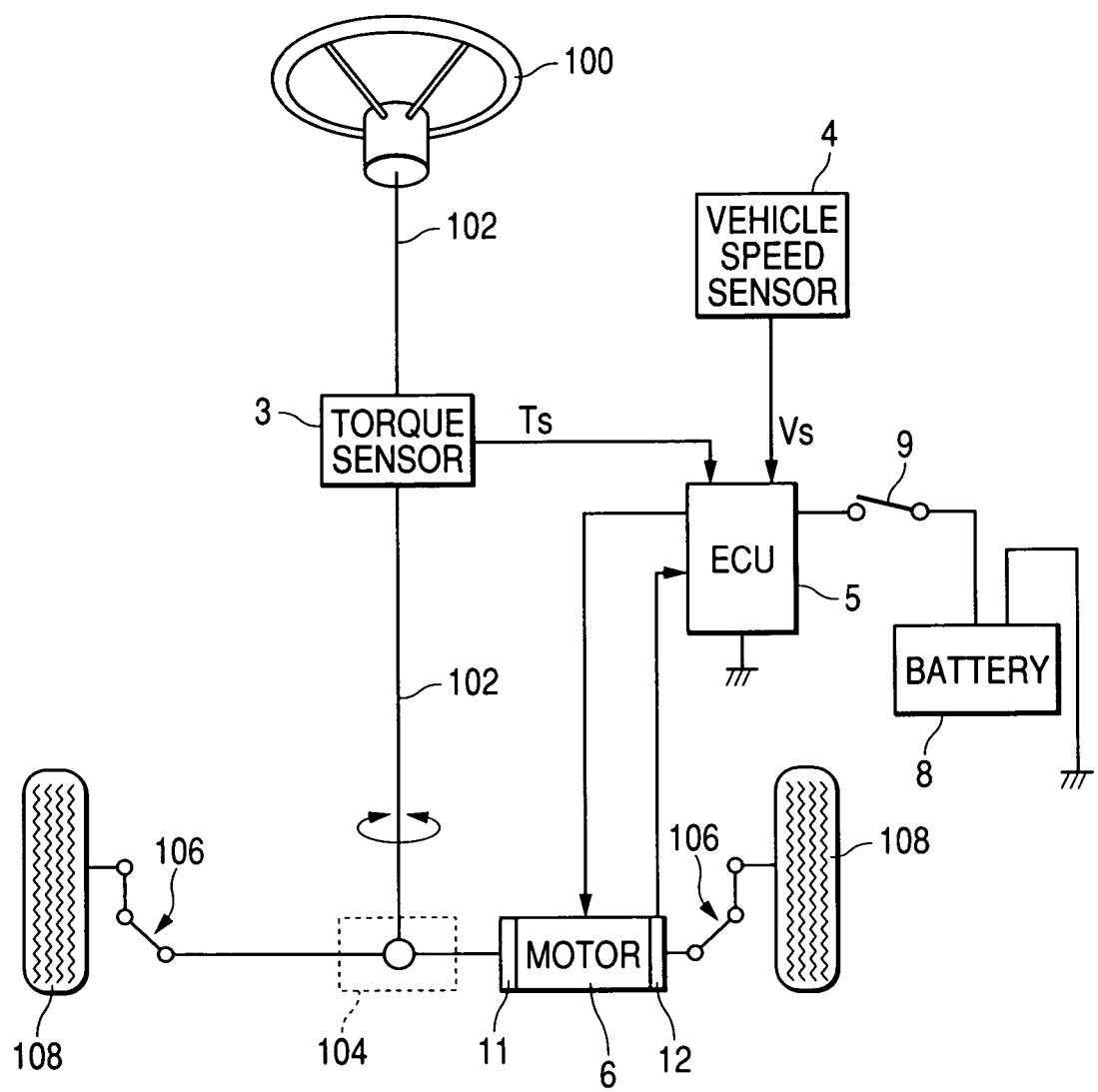
FIG. 1 is an outline view showing a constitution of an electric power steering apparatus according to an embodiment of the invention along with a constitution of a vehicle related thereto.

FIG. 1 is an outline view showing a constitution of an electric power steering apparatus according to an embodiment of the invention along with a constitution of a vehicle related thereto. The electric power steering apparatus is provided with a steering shaft 102 one end which is fixedly attached to a handle (steering wheel) 100 constituting an operating unit for steering, a rack pinion mechanism 104 connected to other end of the steering shaft 102, a torque sensor 3 for detecting a steering torque applied to the steering shaft 102 by operating the steering wheel 100, a brushless motor 6 for generating a steering assisting force for alleviating a load of the driver in steering wheel operation (steering operation), a ball screw driving portion 11 for transmitting the steering assisting force to a rack shaft, a position sensor 12 of a resolver or the like for detecting a rotational position of a rotor of the motor 6, and an electronic control unit (ECU 5) for controlling to drive the motor 6 based on sensor signals from the torque sensor 3, a vehicle speed sensor 4 and the position sensor 12 by being applied with a power source from a vehicle-mounted battery 8 via an ignition switch 9. In the vehicle mounted with such an electric power steering apparatus, when the driver operates the steering wheel 100, the torque sensor 3 detects the steering torque by the operation and outputs a steering torque signal Ts indicating the steering torque. Meanwhile, the vehicle speed sensor 4 detects a vehicle speed which is a running speed of the vehicle and outputs a vehicle speed signal Vs indicating the vehicle speed. ECU 5 as a control apparatus drives the motor 6 based on the steering torque signal Ts and the vehicle speed signal Vs and the rotational position of the rotor detected by the position sensor 12. Thereby, the motor 6 generates the steering assisting force and by applying the steering assisting force to the rack shaft via the ball screw driving portion 11, the load of the driver in the steering operation is alleviated. That is, the rack shaft is reciprocally moved by a sum of the steering force by the steering torque applied by operating the steering wheel and the steering assisting force generated by the motor 6. Both ends of the rack shaft are connected to wheels 108 via connecting members 106 each comprising a tie rod and a knuckle arm and directions of the wheel 108 are changed in accordance with reciprocal movement of the rack shaft.

<2.2 Constitution of Control Apparatus>

Figure 2:
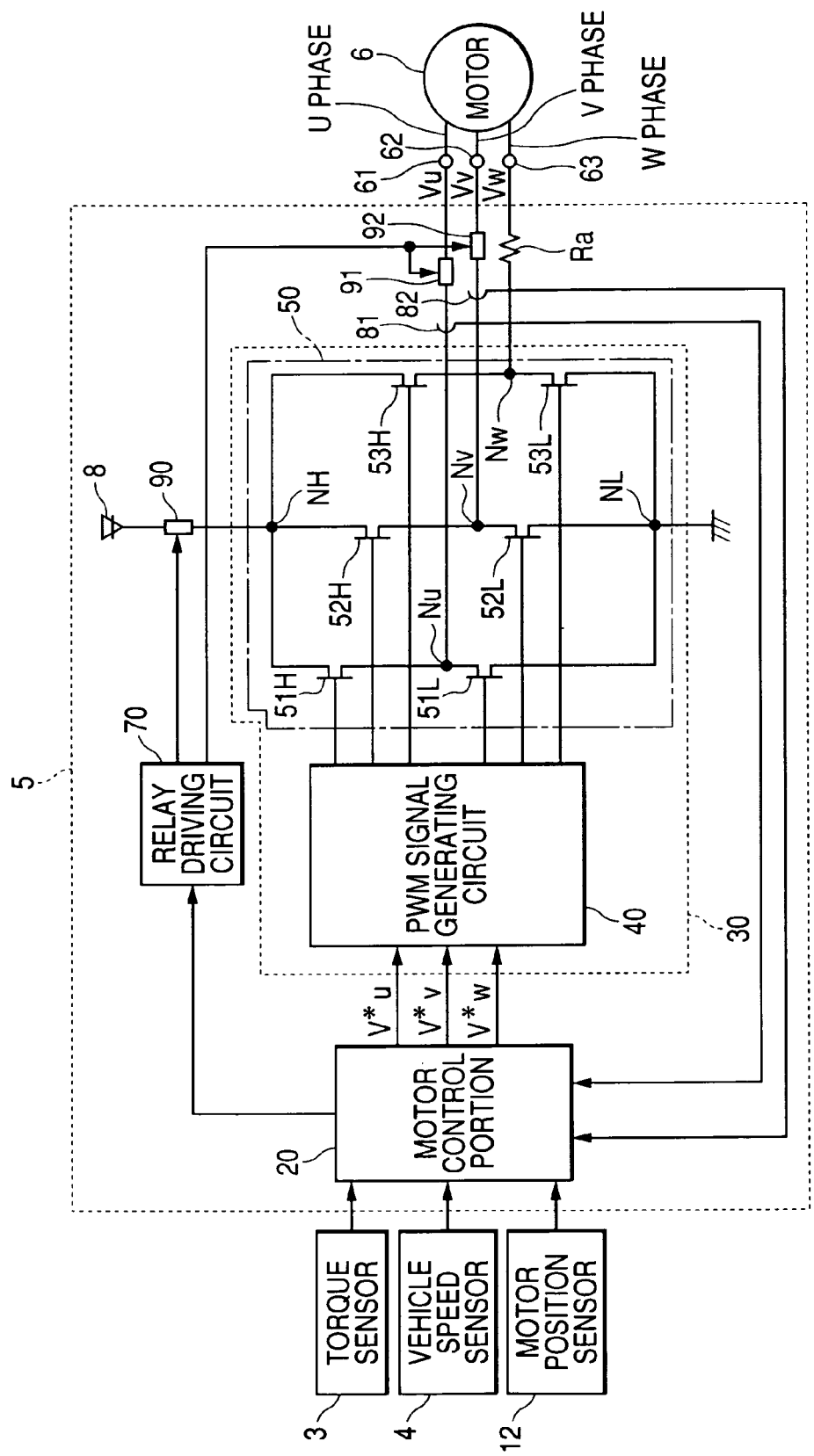
FIG. 2 is a block diagram showing a constitution of ECU which is a control apparatus in the electric power steering apparatus according to the embodiment.

FIG. 2 is a block diagram showing a constitution of ECU 5 which is a control apparatus of the electric power steering apparatus. ECU 5 is provided with a motor control portion 20, a motor driving portion 30, a relay driving circuit 70 and 2 pieces of current detectors 81, 82. The motor control portion 20 is a control operating unit constituted by a microcomputer and is operated by executing a predetermined program stored in a memory at inside thereof. The motor driving portion 30 is constituted by a PWM signal generating circuit 40 and a driving circuit 50.

The driving circuit 50 is provided with FET (field effect transistor) 51H, 52H, 53H which are power switching elements arranged on a power source line side and respectively in correspondence with U phase, V phase, W phase of the motor 6, and FET 51L, 52L, 53L which are power switching elements arranged on a ground line side and respectively in correspondence with U phase, V phase, W phase of the motor 6, and connected in series to constitute respective pairs by the power source line side FET (hereinafter, abbreviated as "Hi side FET") 5jH and the ground line side FET (hereinafter, abbreviated as "Lo side FET") 5jL (j=1, 2, 3). Generally, a circuit portion on the power source line side including FET 51H through 53H are referred to as "upper arm", and a circuit portion on the ground line side including FET 51L through 53L are referred to as "lower arm". Respective connection points Nu, Nv, Nw of the upper arm and the lower arm are connected to terminals 61 through 63 of respective phases of the motor by lead wires for power (specifically, constituted by bus bars), thereby, current supply paths for supplying driving currents from the driving circuit 50 to the motor 6 are formed for respective phases. Further, a relay 91 is inserted into the current supply path formed by the lead wire connecting the connection point Nu in correspondence with u phase and the motor terminal 61 (hereinafter, referred to as "current supply path for u phase"), and a relay 92 is inserted into the current supply path formed by the lead wire connecting the connection point Nv in correspondence with v phase and the motor terminal 62 (hereinafter, referred to as "current supply path for v phase"), respectively. Further, a relay 90 is also inserted between a connection point (power source side branch point, mentioned later) in which source terminals of the Hi side FET 51H through 53H are connected to each other and the battery 8. In contrast thereto, a relay is not inserted into the current supply path (hereinafter, referred to as "current supply path for w phase") formed by the lead wire connecting the connection point Nw in correspondence with w phase and the motor terminal 63.

The current detector 81 on one side in 2 pieces of the current detectors 81, 82 detects u phase current flowing in the lead wire connecting the connection point Nu of the driving circuit 50 and the motor terminal 61 (current supply path for u phase), and the current detector 82 on other side detects v phase current flowing in the lead wire (current supply path for v phase) connecting the connection point Nv of the driving circuit 50 and the motor terminal 62. Current values detected by the current detectors 81, 82 are respectively inputted to the motor control portion 20 as a u phase current detected value Iu and a v phase current detected value Iv.

The motor control portion 20 receives a steering torque detected by the torque sensor 3, a vehicle speed detected by the vehicle speed sensor 4, and u phase and v phase current detected values Iu, Iv detected by the current detectors 81, 82. Further, the motor control portion 20 determines a target current value to be made to flow to the motor 6 based on the steering torque and the vehicle speed in reference to a table for corresponding the steering torque and the target current value which is referred to as an assist map. Further, instruction values V*u, V*v, V*w of respective phases to be supplied to the motor 6 are calculated by proportional integrating operation based on a deviation between the target current value and a motor current value calculated by the motor current detected values Iu, Iv.

In calculating the instruction values V*u, V*v, V*w of the respective phase voltages, normally, voltages and currents as 3 phase alternating currents with regard to driving of the motor, are expressed by a rotating orthogonal coordinates system (referred to as "d-q coordinates") comprising d axis in a direction of a magnetic flux by field of the rotor of the motor, and q axis which is orthogonal to d axis and a phase of which is advanced from d axis by π/2. According to the d-q coordinates, the current made to flow to the motor can be dealt with as a direct current comprising a d axis component and a q axis component. In this case, after calculating the d axis component and the q axis component of the motor current value by coordinate conversion from the u phase and the v phase current detected values Iu, Iv, a d axis voltage instruction value is calculated by proportional integrating operation based on a deviation between a d axis component of the target current value and the d axis component of the motor current value, and a q axis voltage instruction value is calculated by proportional integrating operation based on a deviation between a q axis component of the target current value and the q axis component of the motor current value. Further, the instruction values V*u, V*v, V*w of the respective phase voltages are calculated from the d axis and the q axis voltage instruction values by coordinate conversion. Although in controlling the brushless motor, a method based on introduction of the d-q coordinates is general, the invention is not limited thereto.

Further, other than calculating the instruction values V*u, V*v, V*w of the respective phase voltages, the motor control portion 20 also outputs a relay control signal for controlling the relay driving circuit 70 based on a result of a predetermined failure detecting processing.

In the motor driving portion 30, the PWM signal generating circuit 40 receives the instruction values V*u, V*v, V*w of the respective phase voltages from the motor control portion 20 and generates a PWM signal a duty ratio of which is changed in accordance with the instruction values V*u, V*v, V*w. The driving circuit 50 is a PWM voltage type inverter constituted by using the Hi side FET 51H through 53H and the Lo side FET 51L through 53L as described above for generating respective phase voltages Vu, Vv, Vw to be applied to the motor 6 by making FET 51H through 53H and 51L through 53L ON/OFF. The respective voltages Vu, Vv, Vw are outputted from ECU 5 to apply to the motor 6. In accordance with application of the voltages, currents are made to flow to coils (not illustrated) of respective phases u, v, w of the motor 6 and the motor 6 generates a torque (motor torque) for assisting steering in accordance with the currents.

The relay driving circuit 70 is operated based on the relay control signal outputted from the control portion 20. The relay driving circuit 70 maintains the relays 90, 91, 92 in a closed state and continues to supply power source to the motor driving portion 30 and the motor 6 until a signal indicating that a failure is detected from the motor control portion 20 is received from the motor control portion 20. When a failure is detected by the failure detecting processing in the motor control portion 20, the relay driving circuit 70 receives the signal indicating that the failure is detected from the motor control portion 20. Thereby, the relay driving circuit 70 brings the relays 90, 91, 92 in an open state and stops to supply the power source to the motor driving portion 30 and the motor 6.

<2.3 Constitution of Essential Portion of Motor-Driving Circuit System>

The electric power steering apparatus according to the embodiment is provided with the following constitution for resolving or reducing differences of resistance components among respective phases (among respective phases u, v, w) in a motor-driving circuit system which is a constitution portion comprising the driving circuit 50, the brushless motor 6 and the lead wires connecting these and the like. Further, also in the embodiment, the transfer function Gm(s) of the motor-driving circuit system can be expressed by the following equation with regard to the respective phases (refer to FIG. 4)

$$Gm(s)=Km/(L \cdot s+R+R') \tag{2}$$

where notation Km designates a constant, and notation R' designates the external resistance including the wiring resistance of the lead wires forming the current supply paths for the respective phases and so on.

As described above, although the relay 91 is inserted into the current supply path for u phase connecting the connection point Nu at inside of the driving circuit 50 and the motor terminal 61 and the relay 92 is inserted into the current supply path for v phase connecting the connection point Nv at inside of the driving circuit 50 and the motor terminal 62, a relay is not inserted into the current supply path for w phase connecting the connection point Nw at inside of the driving circuit 50 and the motor terminal 63. Hence, according to the embodiment, the current supply path for w phase is inserted with a resistor member Ra having a resistance value substantially equal to a contact resistance value which is a resistance value in an ON state of the relay 91 or 92.

By inserting the resistor member Ra, the differences of the resistance components of the external resistor R' with regard to electric connection between the driving circuit 50 and the motor 6, that is, the differences of resistance values of the current supply paths for supplying the currents from the driving circuit 50 to the motor 6 are reduced or resolved. Further, although in inserting the resistor member Ra, specifically, a resistor in correspondence therewith may be inserted into the current supply path for w phase into which a relay is not inserted, in place thereof, insertion of the resistor member Ra may be realized by pertinently setting a sectional area (width or thickness) and/or a length of the bus bar forming the lead wire as the current supply path for w phase as described later.

Figure 3A:
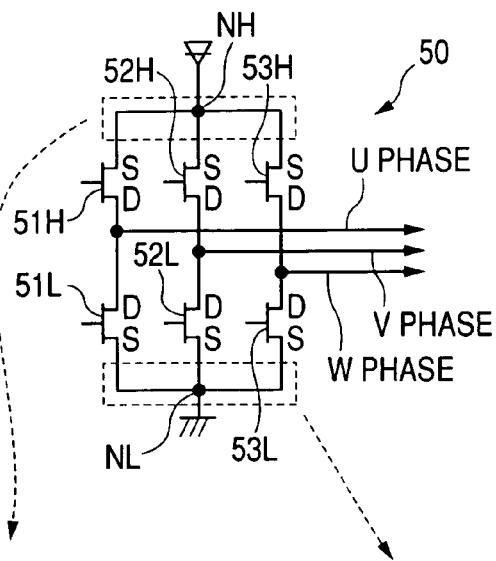
FIGS. 3A to 3C illustrates a circuit diagram.
Figure 3B:
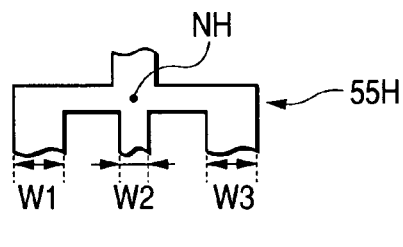
Figure 3C:
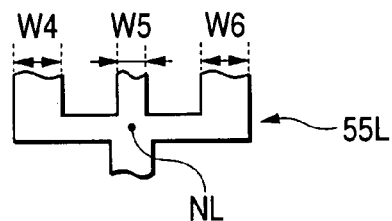

Further, according to the embodiment, in order to resolve the differences of the external resistor R' among the respective phases, a wiring resistance at inside of the driving circuit 50 is adjusted. That is, when the 3 phase voltage type inverter shown by FIG. 3A is used as the driving circuit 50, it is difficult to make wiring lengths between the power source and FET 51H through 53H which are the switching elements on the Hi side and wiring lengths between the ground point and FET 51L through 53L which are the switching elements on the Lo side. Hence, according to the embodiment, in the current paths reaching the Hi side FET 51H through 53H from the battery 8 which is a power source, a bus bar 55H at and after a connection point (hereinafter, referred to as "power source side branch point") NH branching respectively to the Hi side FET 51H through 53H is provided with a shape as shown by FIG. 3B. That is, a width W1 of a portion of the bus bar 55H from the power source side branch point NH to a source terminal of the Hi side FET 51H, a width W2 of a portion thereof from the power source side branch NH to a source terminal of the Hi side FET 52H, and a width W3 of a portion thereof from the power source branch point NH to a source terminal of the Hi side FET 53H are set such that resistance values of wirings from the power source side branch point NH to 3 pieces of the Hi side FET 51H through 53H are equal to each other (normally, W1 =W3 >W2). Further, a bus bar 55L at and after a connection point (hereinafter, referred to as "ground side branch point") NL branching to the respective Lo side FET 51L through 53L in the current paths reaching the Lo side FET 51L through 53L from the ground point is provided with a shape as shown by FIG. 3C. That is, a width W4 of a portion of the bus bar 55L from the ground side branch point NL to a source terminal of the Lo side FET 51L, a width W5 of a portion thereof from the ground side branch point NL to the Lo side FET 52L and a width W6 of a portion thereof from the ground side branch point NL to a source terminal of the Lo side FET 53L are set such that resistance values of wirings from the ground side branch point NL to 3 pieces of the Lo side FET 51L through 53L are equal to each other (normally, W4 =W6 >W5).

By setting (adjusting) the widths W1 through W6 of the bus bars forming the wirings at inside of the driving circuit 50 as described above, in the external resistance R', differences among resistance components among respective phases of u, v, w phases with regard to the wirings at inside of the driving circuit 50 are reduced or resolved. Differences of the internal resistance R among the phases of the motor 6 can substantially be disregarded and therefore, by adjusting the external resistance R' among the respective phases as described above, the differences among the respective phases of the resistance components including both of the internal resistance R and the external resistance R' in the motor-driving circuit system can be made to be equal to or smaller than a predetermined value (for example, equal to or smaller than 5%).

Further, generally, it is not easy to change the thickness and the length of the bus bar and therefore, according to the embodiment, the wiring resistances are adjusted among the respective phases by pertinently setting the width W1 through W3 and W4 through W6 of the bus bars 55H, 55L. However, the differences among the respective phases of the resistance components in the driving circuit 50 may be reduced or resolved by adjusting the wiring resistances among the respective phases by adjusting the thicknesses (or sectional areas) and/or the lengths along with the widths or in place of the widths.

<2.4 Operation and Effect>

Figure 5:
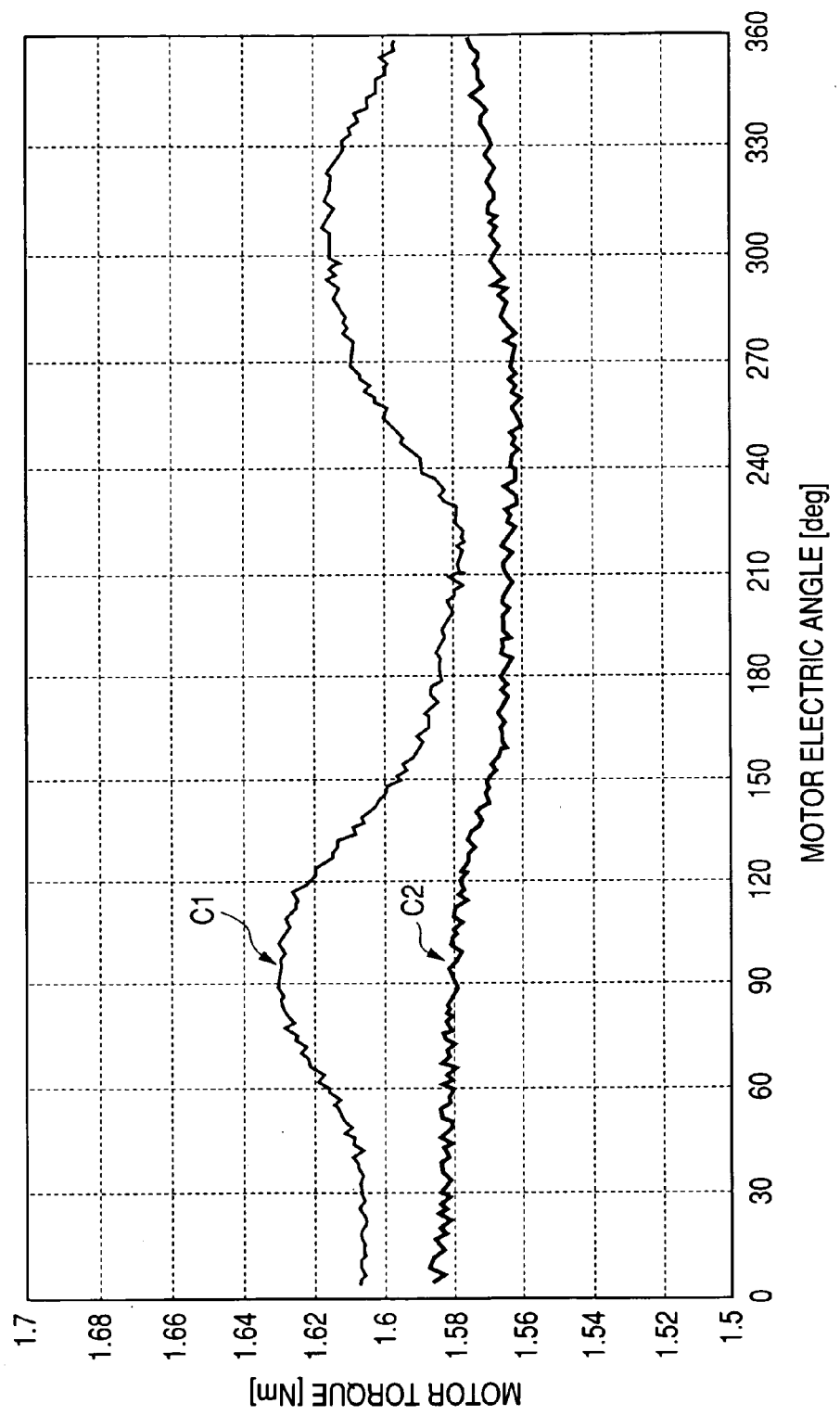
FIG. 5 is a waveform diagram of a motor torque for explaining an effect of reducing a torque ripple according to the embodiment.

As described above, according to the embodiment, the differences among the respective phases are resolved or reduced with regard to the resistance values of the current supply paths for supplying the currents from the driving circuit 50 to the motor 6 and the resistance values of the wirings at inside of the driving circuit 50, thereby, the differences among the respective phases of the external resistance R' in the motor-driving circuit system are resolved or reduced. Further, the differences of the internal resistance R and the inductance L are substantially to a negligible degree and therefore, not only the differences among the respective phases of the resistance components in the motor-driving circuit system are resolved or reduced as described above but also the gains and the phases of the motor-driving circuit system with regard to respective phases are substantially equal to each other. As a result, in any of u, v, w phases, when the same phase voltage is applied thereto, substantially the same phase current is made to flow in the motor 6 and therefore, the torque ripple in the motor 6 can be reduced. For example, although a change in the motor torque in the electric power steering apparatus of the related art with respect to a motor electric angle is provided with a waveform as shown by a curve C1 (slender curve) in FIG. 5, according to the embodiment, the change in the motor torque with respect to the motor electric angle is provided with a waveform as shown by a curve C2 (bold curve) in FIG. 5 and it is known that the torque ripple is significantly reduced. Further, according to an example of outputting the motor torque represented by the waveform shown by the curve C2 in FIG. 5, the differences among the respective phases of the resistance components in the motor-driving circuit system become equal to or smaller than 1%. In this way, according to the embodiment, a driver can be prevented from feeling a strange feeling in steering operation by reducing the torque ripple in the motor.

Further, according to the embodiment, by pertinently setting the widths or the like of the bus bars used for the wirings, the resistance components in the motor-driving circuit system are adjusted and therefore, it is not necessary to separately add a resistor or the like for adjusting the resistances among the phases. Therefore, the differences of the gains and the phases of the motor-driving circuit system among the phase can be reduced or resolved while restraining an increase in cost.

<3. Modified Examples>

Although according to the above-described embodiment, in order to reduce or resolve the differences among the respective phases of the resistance components in the motor-driving circuit system, the adjusting resistor member Ra is inserted into the path which is not inserted with a relay in the current supply paths for supplying the currents from the driving circuit 50 to the motor 6 (FIG. 2) and there is constructed a constitution in which the shapes of the bus bars forming the wirings at inside of the driving circuit 50 are adjusted (FIGS. 3A to 3C), in place thereof, there may be constructed a constitution of adopting only either one of the two resistance adjusting units for adjusting the resistance components of the motor-driving circuit system among the phases. For example, when the relays are inserted to all of the current supply paths reaching the motor 6 from the driving circuit 50, only the wiring resistance at inside of the driving circuit 50 may be adjusted (for example, pertinently setting the widths of the bus bars). Further, there may be constructed a constitution of further providing other distance adjusting unit other than the above-described two resistance adjusting units so far as the other resistance adjusting unit is the resistance adjusting unit for reducing or resolving the differences among the respective phases of the resistance components in the motor-driving circuit system.

Further, although in the above-described embodiment, the brushless motor 6 of 3 phases is used as the drive source of the electric power steering apparatus, a number of phases of the brushless motor is not limited to 3 but the invention is applicable also to an electric power steering apparatus using a brushless motor of 4 or more phases.

What is claimed is:

1. An electric power steering apparatus for applying a steering assisting force to a steering mechanism of a vehicle by driving a brushless motor based on a target value determined in accordance with an operation for steering the vehicle, the electric power steering apparatus comprising:
   a control operating unit that calculates an instruction value of a voltage to be applied to the brushless motor based on the target value;
   a driving circuit that drives the brushless motor based on the instruction value; and
   a resistance adjusting unit that adjusts resistance components in a motor-driving circuit system such that differences among respective phases of the resistance components in the motor-driving circuit system including the brushless motor and the driving circuit become equal to or smaller than a predetermined value.

2. The electric power steering apparatus according to claim 1, further comprising an opening/closing unit inserted into at least one electric supply path in the current supply paths provided for respective phases of the brushless motor for supplying currents from the driving circuit to the brushless motor,
   wherein the resistance adjusting unit includes a resistor inserted into the current supply path which is not inserted with the opening/closing unit and the resistor has a resistance value in accordance with a resistance value in a closed state of the opening/closing unit such that differences among the respective phases of resistance values in the current supply paths become equal to or smaller than a predetermined value.

3. The electric power steering apparatus according to claim 1, wherein the driving circuit is constituted by a plurality of pairs of switching elements connected in parallel by a number of the phases of the brushless motor, each of the pairs of switching elements includes a Hi side switching element which is the switching element arranged on a power source side and a Lo side switching element which is the switching element arranged on a ground point side, and a connection point of the Hi side switching element and the Lo side switching element is connected to the brushless motor via the current supply path; and
   wherein the resistance adjusting unit includes a resistor for adjusting the resistance value of at least one of the Hi side current path and the Lo side current path such that at least one of the differences among the respective phases of the resistance values of the Hi side current paths which are the current paths from the power source to the Hi side switching elements and the differences among the respective phases of the resistance values of the Lo side current paths which are the current paths from Lo side switching elements to the ground point becomes equal to or smaller than the predetermined value.

4. The electric power steering apparatus according to claim 1, wherein the motor-driving circuit system includes a bus bar for wiring, and the resistance adjusting unit is constituted by adjusting at least one of a sectional area and a length of the bus bar such that the differences among the respective phases of the resistance components of the motor-driving circuit system become equal to or smaller than the predetermined value.

* * * * *